(12) United States Patent
Carballal Camacho

(10) Patent No.: US 11,737,384 B2
(45) Date of Patent: *Aug. 29, 2023

(54) DEVICE FOR COMBING AND CONDITIONING ARTIFICIAL TURF

(71) Applicant: Comercial Carma, S.A., Madrid (ES)

(72) Inventor: Lisardo Carballal Camacho, Madrid (ES)

(73) Assignee: Comercial Carma, S.A., Móstoles (ES)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,246

(22) Filed: Sep. 19, 2022

(65) Prior Publication Data

US 2023/0013241 A1 Jan. 19, 2023

Related U.S. Application Data

(63) Continuation of application No. 16/487,186, filed as application No. PCT/ES2017/000144 on Nov. 17, 2017, now Pat. No. 11,445,652.

(30) Foreign Application Priority Data

Feb. 23, 2017 (ES) .............................. ES201700108U

(51) Int. Cl.
*A01B 45/00* (2006.01)
*A01G 20/35* (2018.01)
(Continued)

(52) U.S. Cl.
CPC .............. *A01B 45/00* (2013.01); *A01G 20/35* (2018.02); *A46B 13/006* (2013.01); *A46B 13/02* (2013.01); *A46B 2200/30* (2013.01)

(58) Field of Classification Search
CPC ...... A46B 13/02; A46B 13/001; A46B 13/006; A01B 45/00; A01G 20/35; A01G 20/43; E01H 1/045; E01H 1/056; E01H 5/098
(Continued)

(56) References Cited

U.S. PATENT DOCUMENTS

| 1,209,722 A | 12/1916 | Kirby |
| 2,753,583 A | 7/1956 | Jepson |

(Continued)

FOREIGN PATENT DOCUMENTS

| CA | 2955813 | 1/2016 |
| CN | 102612876 | 8/2012 |

(Continued)

OTHER PUBLICATIONS

Extended European Search Report in European Application Serial No. 17897373.1, dated Dec. 8, 2020, from co-pending U.S. Appl. No. 16/487,244.

(Continued)

*Primary Examiner* — Randall E Chin
(74) *Attorney, Agent, or Firm* — Hovey Williams LLP

(57) ABSTRACT

The invention relates to a device for combing and conditioning artificial turf, which comprises a handle (1), a pole (2), a head (3) which houses an electric motor (4), and a pair of brushes (5) driven by the electric motor (4), the brushes (5) being configured for combing and conditioning the artificial turf, and such that the brushes (5) have a helical shape.

9 Claims, 2 Drawing Sheets

(51) Int. Cl.
*A46B 13/00* (2006.01)
*A46B 13/02* (2006.01)

(58) Field of Classification Search
USPC .......................................................... 15/182
See application file for complete search history.

(56) References Cited

U.S. PATENT DOCUMENTS

| | | | |
|---|---|---|---|
| 3,793,782 A * | 2/1974 | Bowling | B24B 23/02 |
| | | | 15/23 |
| 4,467,591 A | 8/1984 | Dynie | |
| 5,269,082 A | 12/1993 | Sund et al. | |
| 5,493,851 A | 2/1996 | Katzer et al. | |
| 5,603,173 A | 2/1997 | Brazell | |
| 6,041,463 A | 3/2000 | Stauch | |
| 6,076,265 A | 6/2000 | Huang Lo | |
| 6,382,325 B1 | 5/2002 | Bovi | |
| 8,161,720 B1 | 4/2012 | Humphrey | |
| 9,043,961 B2 | 6/2015 | Gil | |
| 2005/0252184 A1 | 11/2005 | Craig | |
| 2006/0096136 A1 * | 5/2006 | Shaffer | E01H 1/12 |
| | | | 37/244 |
| 2008/0189870 A1 * | 8/2008 | Dayton | B08B 1/04 |
| | | | 173/217 |
| 2012/0247794 A1 | 10/2012 | Dufty | |
| 2013/0192633 A1 | 8/2013 | Gil | |
| 2013/0212815 A1 | 8/2013 | Kempf et al. | |
| 2015/0034391 A1 * | 2/2015 | McLain | A46B 13/02 |
| | | | 15/97.1 |
| 2016/0230361 A1 | 8/2016 | Prew | |
| 2018/0070785 A1 | 3/2018 | Udy et al. | |

FOREIGN PATENT DOCUMENTS

| | | |
|---|---|---|
| GB | 2301012 | 11/1996 |
| KR | 101080190 | 11/2011 |
| WO | 2016042383 | 3/2016 |

OTHER PUBLICATIONS

International Search Report in PCT Application No. PCT/ES2017/000145, dated Feb. 26, 2018 (English translation attached), from co-pending U.S. Appl. No. 16/487,244.
Office Action from co-pending U.S. Appl. No. 16/487,244, dated Apr. 16, 2021.
International Search Report in corresponding PCT Application No. PCT/ES2017/000144, dated Apr. 3, 2018 (Engish translation attached).
Office Action from corresponding U.S. Appl. No. 16/487,186, dated Mar. 15, 2021.
Office Action from corresponding U.S. Appl. No. 16/487,186, dated Oct. 8, 2021.
Office Action from corresponding U.S. Appl. No. 16/487,186, dated Apr. 5, 2022.

* cited by examiner

DEVICE FOR COMBING AND CONDITIONING ARTIFICIAL TURF

RELATED APPLICATIONS

This application is a continuation of U.S. Ser. No. 16/487,186, filed Aug. 20, 2019, now U.S. Pat. No. 11,445,652, which is the U.S. National Stage of International Patent Application No. PCT/ES2017/000144, filed Nov. 17, 2017, which is hereby incorporated by reference in its entirety, and which claims priority to Spanish Patent Application No. U201700108, filed Feb. 23, 2017.

DESCRIPTION

Object of the Invention

The present invention relates to a device for combing and conditioning artificial turf, which by means of a simple system of rollers provides optimum features for combing and conditioning artificial turf.

Technical Problem to be Resolved and Background of the Invention

There are currently many different types of artificial turf that substitute traditional turf, since the maintenance of traditional turf is complicated, expensive and requires continuous attention with respect to cutting, as well as fertilisers and nutrients that must be added for the correct growth thereof. On occasions, even when taking all of the necessary precautions and properly caring for traditional turf, invasive plant species can ruin an entire field.

Artificial turf has different qualities, according to the thread of which it is made up, and if the thread is too fine and delicate the fibres will be crushed more easily and the turf will have less resistance.

Furthermore, artificial turf becomes dirty, gets full of dust, mud, seeds, bird droppings, leaves, sand and other human elements such as paper, sunflower seeds and cigarette butts, which facilitate the formation of algae, moss or weeds, which can affect the drainage required by an artificial turf installation.

The fibre of the turf tends to lose its upright firmness over time due to the weather, especially if the use thereof is continuous, which becomes an aesthetic problem, and also constitutes a problem when demonstrating a field with artificial turf.

Furthermore, in turf subjected to an intensive use, a phenomenon known as defibrillation occurs, which happens when we have too little infill or it is unduly moved, and as such the fibre opens into more fibres due to the friction of people's shoes, leading to the breakage of fine fibres, which remain on the surface.

DESCRIPTION OF THE INVENTION

The object of the present invention is a portable device for combing and conditioning artificial turf which, by means of the device itself, allows the turf to be optimally maintained and, in addition, removes the dirt on the same that accumulates.

The device for combing and conditioning artificial turf object of the invention comprises a handle, a pole, a head and a pair of brushes driven by an electric motor housed in the head. The brushes are configured to comb and condition the artificial turf.

In the device for combing and conditioning artificial turf object of the invention, the brushes have a helical shape, and thus the rotation of the brushes in a single direction makes it so that the dirt swept by the cited brushes is removed from the turf.

The pole of the device for combing and conditioning artificial turf comprises a gripper for the left hand, and as such this gripper allows the device to be held by both hands, increasing the maneuverability of the same.

The device for combing and conditioning artificial turf object of the invention comprises a transmission connected to the motor for transmitting the movement of the motor to the brushes. The transmission comprises a motor output shaft that is associated with a transmission belt which transmits the rotation of the motor output shaft to a wheel, likewise, the wheel transmits the rotation to a transmission shaft which, in turn, ends in a worm screw, wherein the worm screw transmits the rotation to a transverse shaft via a toothed wheel attached to the cited transverse shaft, such that the transverse shaft makes the pair of brushes rotate, which are attached to the transverse shaft.

The device for combing and conditioning artificial turf object of the invention comprises a cover formed by two halves that attach to each other, covering the motor and the transmission, and thus the cover is situated on the end of the pole opposite the handle and protects the components of the device.

DESCRIPTION OF THE DRAWINGS

To complete the description, the present specification is accompanied by a set of figures constituting an integral part of the same, which represent the following.

PREFERRED EMBODIMENT OF THE INVENTION

Figure 1:
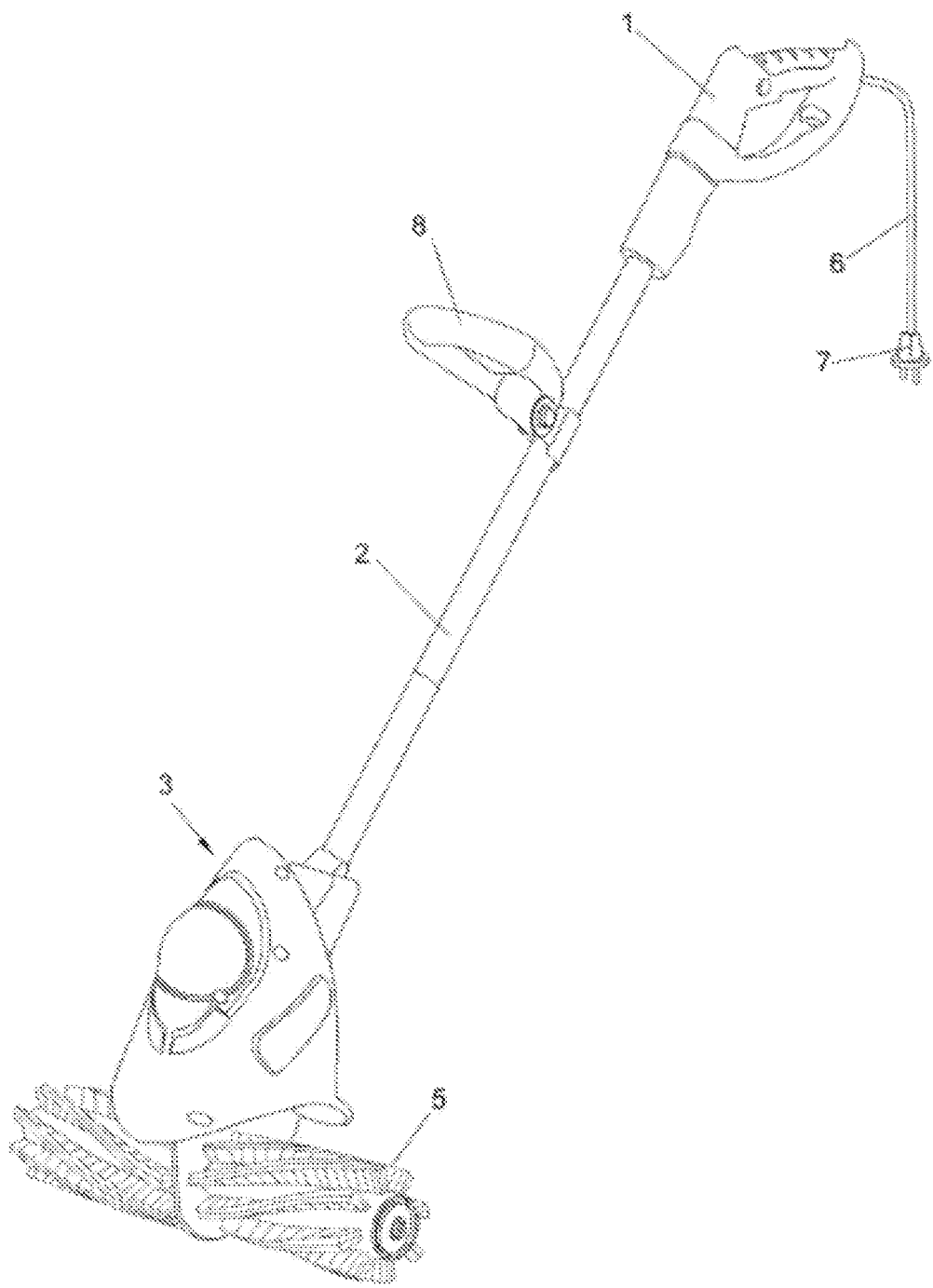
FIG. 1 shows a perspective view of the device for combing and conditioning the turf object of the invention.
Figure 2:
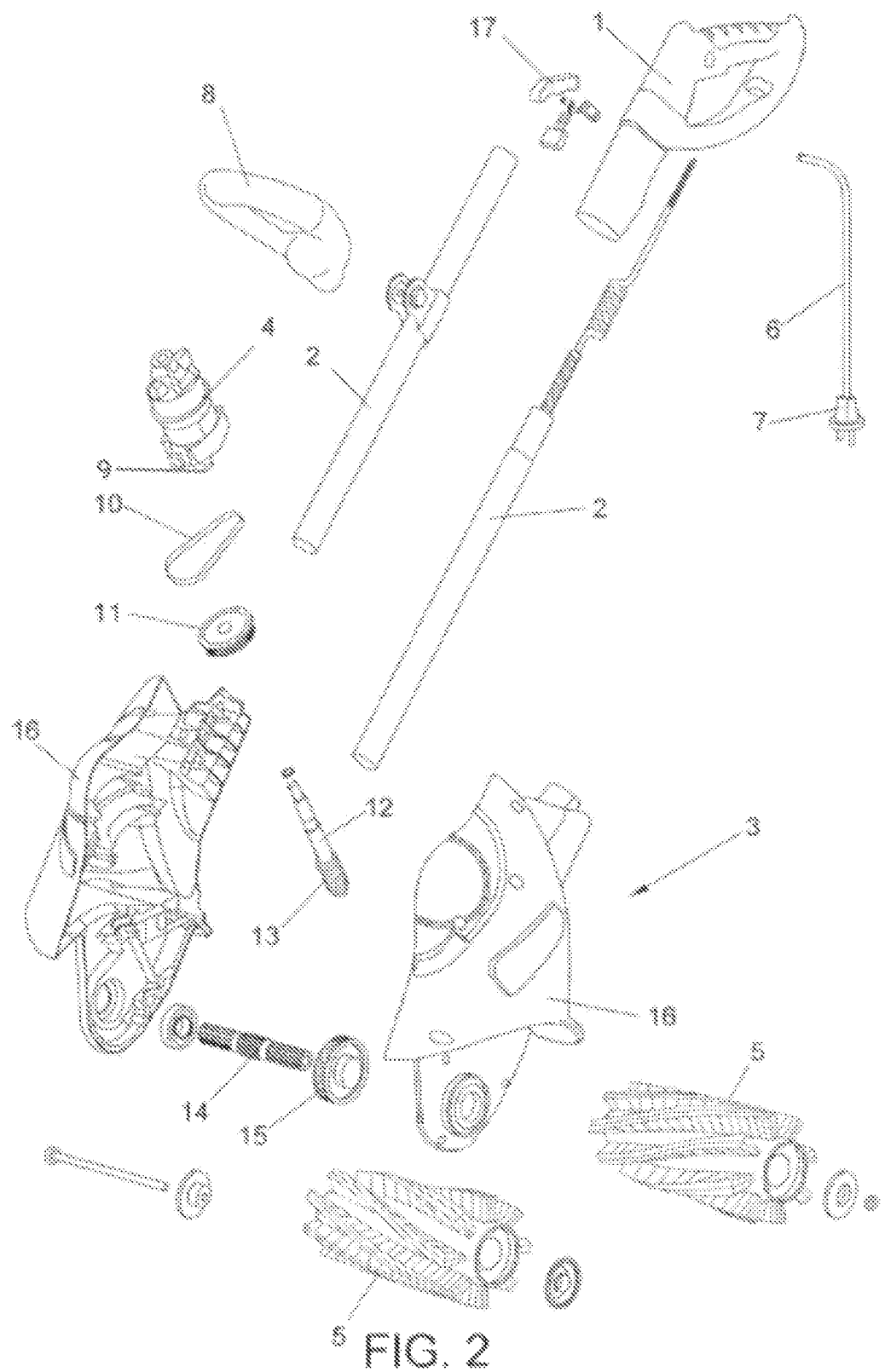
FIG. 2 shows an exploded view of all of the components of the device for combing and conditioning the turf object of the invention.

The object of the present invention, as previously indicated and as can be seen in the figures, is a device for combing and conditioning artificial turf that has a handle (1), a pole (2), a head (3) which houses an electric motor (4) and a pair of brushes (5) driven by the electric motor (4), the brushes (5) being configured for combing and conditioning the artificial turf.

The electric motor (4) receives the electrical energy by means of a cable (6), the end of which has a plug (7), which is joined to the device at the handle (1), and an electric installation that runs along the pole (2) until reaching the aforementioned electric motor (4). It is the same for the electric motor (4).

To hold the device object of the invention in a more stable way, it has a gripper (8) on the pole (2) for the left hand of the user, such that with the handle (1) and the gripper (8) the device object of the invention can be manually operated in an easier way.

The movement of the electric motor (4) is transmitted to the brushes (5) via a transmission, which carries out two gear reductions. The transmission has a motor output shaft (9) that is associated with a transmission belt (10) which transmits the rotation of a wheel (11), a first gear reduction of the rotation speed of the electric motor (4) having been produced in these elements. Before reaching the brushes (5), the wheel (11) transmits the rotation to a transmission shaft (12) that ends in a worm screw (13) which transmits the rotation to a transverse shaft (14) via a toothed wheel (15) attached to the transverse shaft (14).

Given that the transverse shaft (14) houses the brushes (5), the transmission shaft (12), via the worm screw (13), rotates the toothed wheel (15) of the transverse shaft (14) and the rotation of said transverse shaft (14) moves the brushes (5) that comb and condition the artificial turf.

With this configuration, the two brushes (5) of the device rotate in the same direction, and as such, for the device object of the invention to operate, the brushes (5) have a helical shape, and thanks to that helical shape, the rotation of the two brushes (5) in the same direction separates the debris situated on the artificial turf.

The device object of the invention comprises a cover (16) formed by two halves that are attachable to each other, covering the motor (4) and the transmission, and thus the cover (16) is situated on the end of the pole (2) opposite the handle (1).

The device object of the invention comprises a trigger (17) located on the handle (1) and configured for changing the rotation speed of the electric motor (4), the trigger (17) being a hand throttle, of the ones known in the state of the art.

INDUSTRIAL APPLICATION

The conditioning comb object of the invention can be applied in the industry of light garden machinery.

The invention claimed is:

1. A device for combing and conditioning artificial turf, wherein the device comprises:
   a handle;
   a pole;
   a head situated on the end of the pole opposite the handle,
   wherein the head comprises an electric motor, a driven shaft, and a pair of brushes coupled to the driven shaft and driven by the electric motor, the brushes being configured for combing and conditioning the artificial turf,
   wherein the head further comprises a cover formed by two halves that are attachable to each other,
   wherein the electric motor is in the cover, and
   wherein the electric motor includes a rotatable output shaft, the output shaft being transversely oriented to the driven shaft.

2. The device according to claim 1, wherein the brushes have a helical shape.

3. The device according to claim 1, wherein the brushes rotate in the same direction.

4. The device according to claim 1, wherein the pole comprises a gripper for the left hand.

5. The device according to claim 1, further comprising a transmission connected to the motor for transmitting movement of the motor to the brushes.

6. The device according to claim 5, wherein the cover formed by two halves that are attachable to each other covers the transmission.

7. The device according to claim 1, wherein the cover does not cover the brushes.

8. The device according to claim 1, wherein the driven shaft rotates at a rotation speed different than the output shaft during rotation of the output shaft.

9. The device according to claim 1, wherein the head further includes a rotatable transmission shaft, the transmission shaft including a worm screw drivingly coupled to the driven shaft, wherein during rotation of the output shaft, the transmission shaft is rotated by the output shaft and the driven shaft is rotated by the transmission shaft.

* * * * *